(12) United States Patent
Finkelstein et al.

(10) Patent No.: US 12,222,454 B2
(45) Date of Patent: Feb. 11, 2025

(54) INTEGRATED LIDAR IMAGE-SENSOR DEVICES AND SYSTEMS AND RELATED METHODS OF OPERATION

(71) Applicant: Sense Photonics, Inc., Durham, NC (US)

(72) Inventors: Hod Finkelstein, Berkeley, CA (US); Dietrich Dehlinger, San Francisco, CA (US); Scott Burroughs, Raleigh, NC (US); Brent Fisher, Bethesda, MD (US)

(73) Assignee: Sense Photonics, Inc., Durham, NC (US)

( * ) Notice: Subject to any disclaimer, the term of this patent is extended or adjusted under 35 U.S.C. 154(b) by 0 days.

(21) Appl. No.: 18/169,909

(22) Filed: Feb. 16, 2023

(65) Prior Publication Data
US 2023/0194679 A1  Jun. 22, 2023

Related U.S. Application Data

(63) Continuation of application No. 16/542,696, filed on Aug. 16, 2019, now Pat. No. 11,598,857.

(Continued)

(51) Int. Cl.
*G01S 7/486* (2020.01)
*G01S 7/481* (2006.01)
(Continued)

(52) U.S. Cl.
CPC .......... *G01S 7/4863* (2013.01); *G01S 7/4816* (2013.01); *G01S 7/4876* (2013.01)

(58) Field of Classification Search
CPC ...... H05K 7/20509; H05K 1/18; H05K 7/209; H05K 2201/10522; H05K 2201/1059;
(Continued)

(56) References Cited

U.S. PATENT DOCUMENTS 9,264,676 B2   2/2016  Cohen et al.
10,141,366 B2  11/2018 Wan
(Continued)

FOREIGN PATENT DOCUMENTS

CN   102445688 A   5/2012
CN   106471621 A   3/2017
(Continued)

OTHER PUBLICATIONS

Extended European Search Report corresponding to EP Application No. 19850045.6 (Feb. 2, 2022).
(Continued)

*Primary Examiner* — Tony Ko
(74) *Attorney, Agent, or Firm* — Kilpatrick Townsend & Stockton LLP

(57) ABSTRACT

A Light Detection and Ranging (LIDAR) apparatus includes a detector having a first pixel and a second pixel configured to output respective detection signals responsive to light incident thereon, and receiver optics configured to collect the light over a field of view and direct first and second portions of the light to the first and second pixels, respectively. The first pixel includes one or more time of flight (ToF) sensors, and the second pixel includes one or more image sensors. At least one of the receiver optics or arrangement of the first and second pixels in the detector is configured to correlate the first and second pixels such that depth information indicated by the respective detection signals output from the first pixel is correlated with image information indicated by the respective detection signals output from the second pixel. Related devices and methods of operation are also discussed.

20 Claims, 4 Drawing Sheets

Related U.S. Application Data

(60) Provisional application No. 62/764,895, filed on Aug. 16, 2018.

(51) Int. Cl.
*G01S 7/4863* (2020.01)
*G01S 7/487* (2006.01)

(58) Field of Classification Search
CPC ........... H05K 7/20918; H05K 7/20927; H05K 7/14322
See application file for complete search history.

(56) References Cited

U.S. PATENT DOCUMENTS

| | | |
|---|---|---|
| 10,488,496 B2 | 11/2019 | Campbell |
| 2005/0285966 A1 | 12/2005 | Bamji et al. |
| 2012/0044093 A1 | 2/2012 | Pala |
| 2013/0234029 A1 | 9/2013 | Bikumandla |
| 2015/0285625 A1 | 10/2015 | Deane |
| 2016/0161599 A1 | 6/2016 | Seliuchenko |
| 2016/0165213 A1 | 6/2016 | Lee et al. |
| 2016/0181226 A1 | 6/2016 | Wan |
| 2017/0131387 A1 | 5/2017 | Campbell et al. |
| 2017/0146657 A1* | 5/2017 | Xu .......................... H04N 23/56 |
| 2017/0257617 A1 | 9/2017 | Retterath |
| 2018/0084238 A1 | 3/2018 | Chossat et al. |

FOREIGN PATENT DOCUMENTS

| | | |
|---|---|---|
| CN | 108369274 A | 8/2018 |
| JP | 2016211881 A | 12/2016 |
| KR | 20140111017 A | 9/2014 |
| KR | 20140147376 A | 12/2014 |

OTHER PUBLICATIONS

Notification of Transmittal of the International Search Report and the Written Opinion of the International Searching Authority, or the Declaration, in corresponding PCT Application No. PCT/US2019/046806 (Dec. 6, 2019).
Cn2019800607778, "Office Action", Oct. 19, 2023, 24 pages.
CN201980060777.8, "Office Action", Jul. 23, 2024, 27 pages.
CN201980060777.8, "Office Action", Apr. 20, 2024, 25 pages.
CN201980060777.8, "Office Action", Oct. 11, 2024, 22 pages.
EP19850045.6, "Office Action", Sep. 26, 2024, 7 pages.
KR 1020217006508, "Office Action", Nov. 27, 2024, 27 pages.

\* cited by examiner

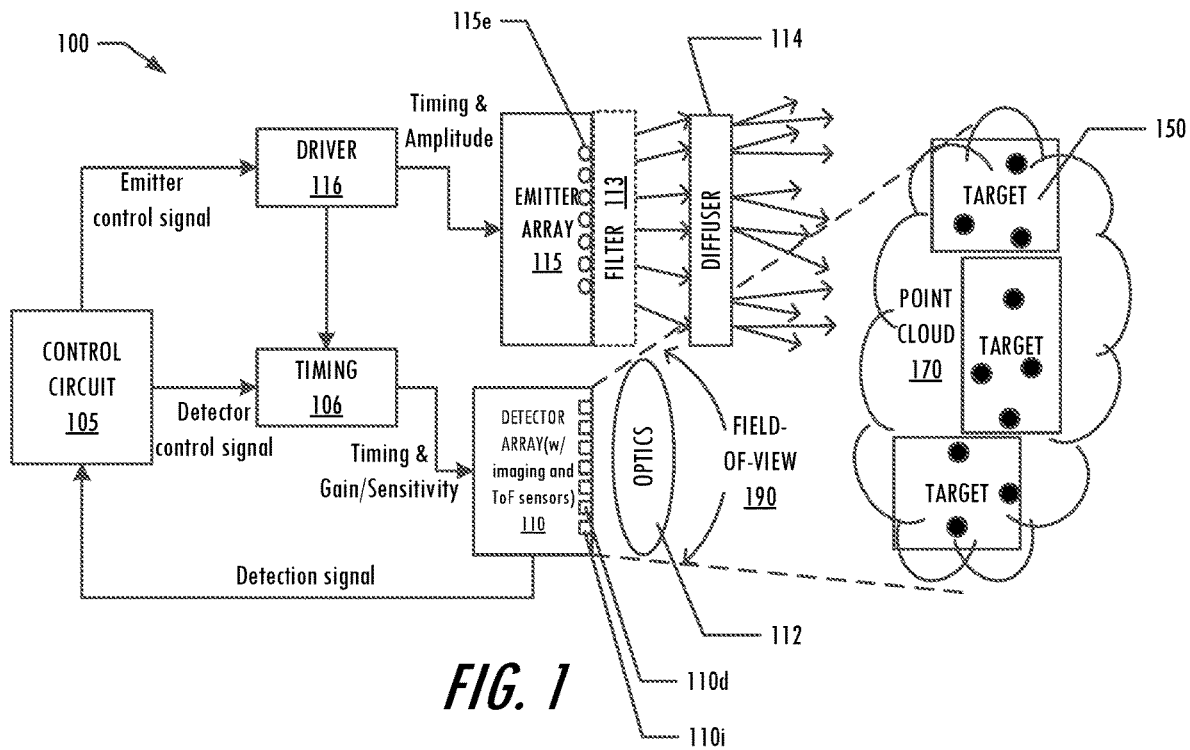
FIG. 1
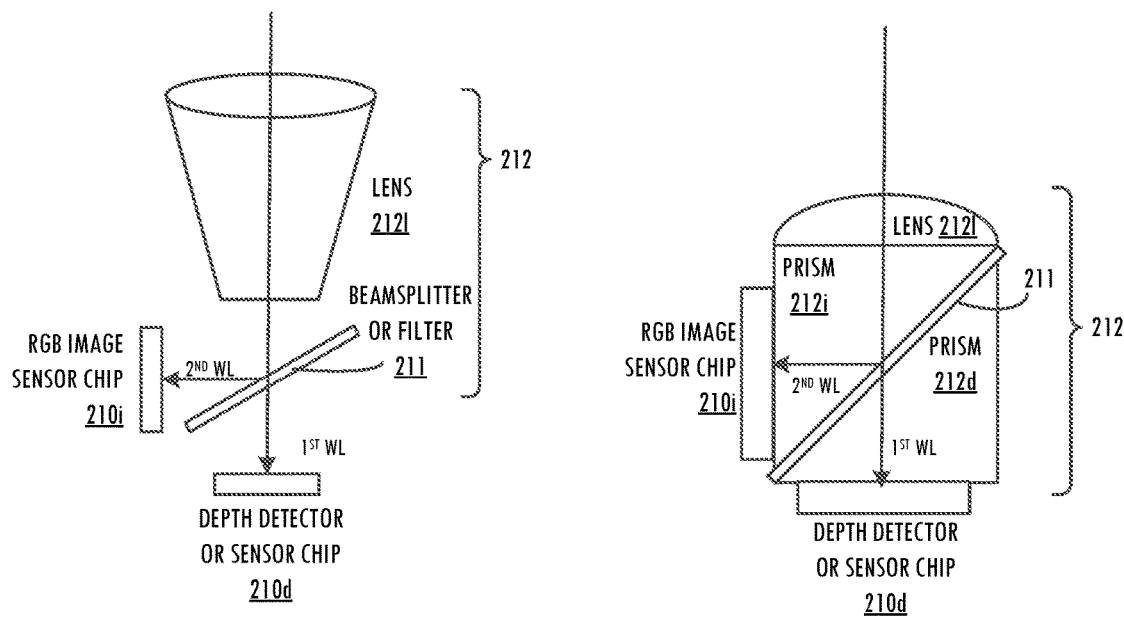
FIG. 2A
FIG. 2B

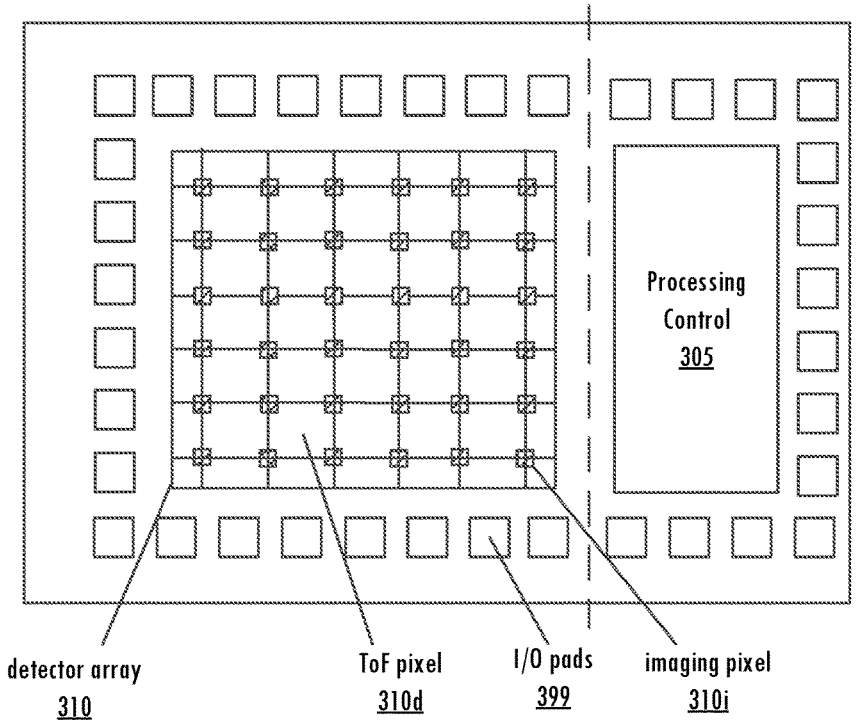
FIG. 3
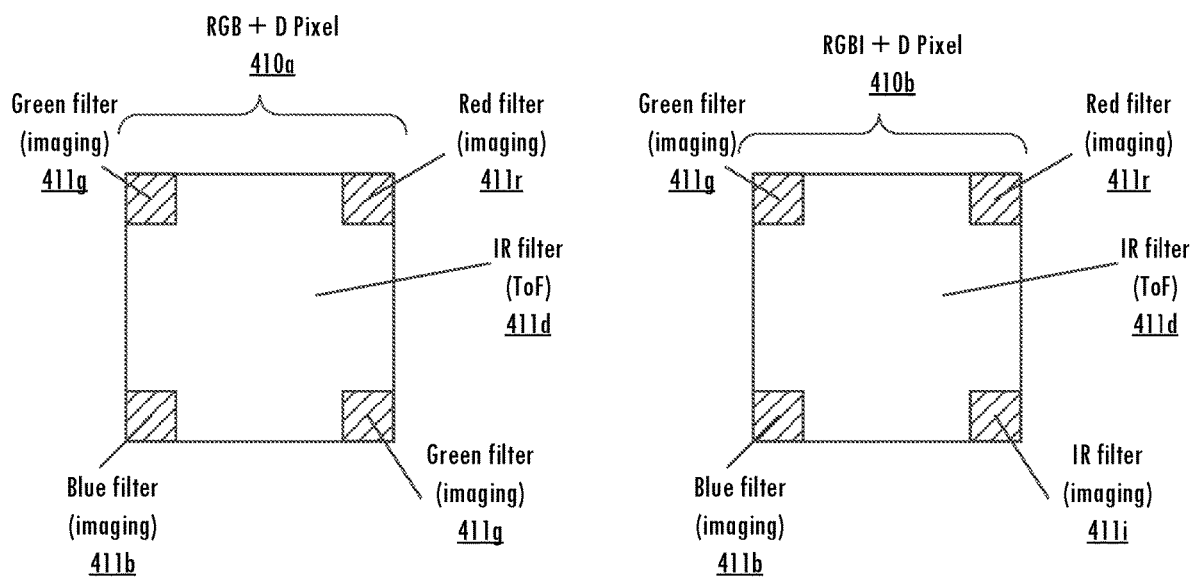
FIG. 4A
FIG. 4B

INTEGRATED LIDAR IMAGE-SENSOR DEVICES AND SYSTEMS AND RELATED METHODS OF OPERATION

CLAIM OF PRIORITY

This application is a continuation of and claims priority from U.S. application Ser. No. 16/542,696, filed on Aug. 16, 2019, which claims priority from U.S. Provisional Application No. 62/764,895, filed on Aug. 16, 2018, the disclosures of which are incorporated by reference herein.

FIELD

The present disclosure is directed systems for three-dimensional (3D) imaging, and more particularly, to time-of-flight Light Detection And Ranging systems.

BACKGROUND

Many emerging technologies, such as Internet-of-Things (IoT) and autonomous navigation, may involve detection and measurement of distance to objects in 3D space. For example, automobiles that are capable of autonomous driving may require 3D detection and recognition for basic operation, as well as to meet safety requirements. 3D detection and recognition may also be needed for indoor navigation, for example, by industrial or household robots or toys.

Light based 3D measurements may be superior to radar (low angular accuracy, bulky) or ultra-sound (very low accuracy) in some instances. For example, a light-based 3D sensor system may include a detector (such as a photodiode or camera) and a light emitting device (such as a light emitting diode (LED) or laser diode) as light source, which typically emits light outside of the visible wavelength range.

A Light Detection and Ranging (LIDAR or lidar) system, may determine a collection of points (e.g., a point cloud) based on the time of flight (ToF) of reflected light. ToF 3D imaging systems can be categorized as indirect ToF (iToF) or direct ToF systems. Direct ToF measurement includes directly measuring the length of time between emitting radiation by an emitter element of a lidar system, and sensing or detecting the radiation after reflection from an object or other target (also referred to herein as a return or echo signal) by a detector element of the lidar system. From this length of time, the distance to the target can be determined. Indirect ToF measurement includes modulating the amplitude of the emitted signal and measuring the phase delay or phase shift (more generally referred to herein as the phase) of the echo signal, where the time required for the signal to travel to and from an object results in a phase shift that is proportional to the distance traveled.

Lidar systems can be used in various applications, such as (but not limited to) industrial automation and autonomous vehicles. Many such systems can acquire data from various modalities, such as lidar, traditional cameras, stereo cameras and radar. Processing units can combine or fuse the data from the various sensors to form an integrated view of the field of view.

SUMMARY

Some embodiments described herein provide methods, systems, and devices including electronic circuits that provide a LIDAR system including one or more emitter elements (including semiconductor lasers, such as surface- or edge-emitting laser diodes; generally referred to herein as emitters) and/or one or more light detector elements (including semiconductor photodetectors, such as photodiodes, including avalanche photodiodes and single-photon avalanche detectors (SPADs); generally referred to herein as detectors).

According to some embodiments of the present disclosure, a Light Detection and Ranging (LIDAR) apparatus includes a detector comprising a first pixel and a second pixel configured to output respective detection signals responsive to light incident thereon, and receiver optics configured to collect the light over a field of view and direct first and second portions of the light to the first and second pixels, respectively. The first pixel includes one or more time of flight (ToF) sensors, and the second pixel includes one or more image sensors. The receiver optics and/or arrangement of the first and second pixels in the detector are configured to correlate the first and second pixels such that depth information indicated by the respective detection signals output from the first pixel is correlated with image information indicated by the respective detection signals output from the second pixel.

In some embodiments, the detector is a detector array comprising a substrate, first junction regions in the substrate defining the ToF sensors, and second junction regions in the substrate defining the image sensors adjacent the first junction regions. The first junction regions may have a first depth relative to a surface of the substrate, and the second junction regions may have a second depth that is less than the first depth relative to the surface of the substrate.

In some embodiments, the arrangement comprises a side-by-side arrangement of the first junction regions and the second junction regions in plan view.

In some embodiments, the arrangement comprises a stacked arrangement wherein the first junction regions and the second junction regions overlap in plan view. Intermediate junction regions may optionally be provided between the first junction regions and the second junction regions in the stacked arrangement.

In some embodiments, the detector array further includes a plurality of gate structures on the substrate between the first pixels and/or between the second pixels. The gate structures may optionally be transparent to at least one of the first or second portions of the light.

In some embodiments, respective isolation structures are provided in the substrate between adjacent ones of the first and second junction regions. The respective isolation structures may be intermediate junction regions between the first junction regions and the second junction regions in the stacked arrangement.

In some embodiments, a plurality of input/output (I/O) pads is provided on the substrate adjacent the detector array and electrically connected to respective pixels of the first and second pixels. The I/O pads may be configured to output the respective detection signals from the first and second pixels having the depth information correlated with the image information to first and second readout circuits, respectively.

In some embodiments, the receiver optics comprise a wavelength-selective beam splitter or filter that is configured to direct the first portion of the light of a first wavelength range to the first pixel, and to direct the second portion of the light of a second wavelength range to the second pixel.

In some embodiments, the receiver optics comprise a monolithic element including at least one lens that is configured to collect the light over the field of view and one or more prisms that couple the wavelength-selective beam splitter or filter to the lens.

In some embodiments, the apparatus further includes an emission source that is configured to output light emission of a first wavelength range to illuminate the field of view. The first portion of the light may include the first wavelength range. A control circuit may be configured to receive the respective detection signals output from the first and second pixels having the depth information correlated with the image information, and to output control signals to adjust the light emission from the emission source based on the respective detection signals from the first pixels and the second pixels.

In some embodiments, the control circuit is configured to operate the first and second pixels at different frame rates.

In some embodiments, the emission source is a first emission source, and the apparatus further includes a second emission source that is configured to output light emission of a second wavelength range to illuminate the field of view, where the second portion of the light comprises the second wavelength range.

According to some embodiments of the present disclosure, a Light Detection and Ranging (LIDAR) apparatus includes a detector array comprising a plurality of first pixels and a plurality of second pixels configured to output respective detection signals responsive to light incident thereon. The first pixels include time of flight (ToF) sensors, and the second pixels include image sensors. The detector array includes a substrate, first junction regions in the substrate that define the ToF sensors, and second junction regions in the substrate that define the image sensors adjacent the first junction regions. The first junction regions have a first depth relative to a surface of the substrate, and the second junction regions have a second depth that is less than the first depth relative to the surface of the substrate.

In some embodiments, the detector array includes a side-by-side arrangement of the first junction regions and the second junction regions in plan view. In some embodiments, the detector array comprises a stacked arrangement wherein the first junction regions and the second junction regions overlap in plan view.

In some embodiments, arrangement of the first and second pixels in the detector array provides respective spatial correlations between subsets of the first pixels and subsets of the second pixels such that the respective detection signals output therefrom comprise depth information and image information, respectively, that are correlated.

In some embodiments, the apparatus further includes receiver optics comprising an array of lenses that are configured to collect the light over a field of view and direct first and second portions of the light to the first and second pixels of the detector array, respectively.

In some embodiments, the receiver optics comprise at least one wavelength-selective beam splitter or filter that is configured to direct the first portion of the light of a first wavelength range to the first pixels, and to direct the second portion of the light of a second wavelength range to the second pixels.

According to some embodiments of the present disclosure, a Light Detection and Ranging (LIDAR) apparatus includes a detector comprising a first pixel and a second pixel configured to output respective detection signals responsive to light incident thereon, and receiver optics configured to collect the light over a field of view and direct first and second portions of the light to the first and second pixels, respectively. The first pixel includes one or more time of flight (ToF) sensors, and the second pixel includes one or more image sensors. The receiver optics are configured to correlate the first and second pixels such that depth information indicated by the respective detection signals output from the first pixel is correlated with image information indicated by the respective detection signals output from the second pixel.

In some embodiments, the receiver optics include a wavelength-selective beam splitter or filter that is configured to direct the first portion of the light of a first wavelength range to the first pixel, and to direct the second portion of the light of a second wavelength range to the second pixel.

In some embodiments, the receiver optics are implemented as a monolithic element including at least one lens that is configured to collect the light over the field of view and one or more prisms that couple the wavelength-selective beam splitter or filter to the lens.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

BRIEF DESCRIPTION OF THE DRAWINGS

FIG. 1 is a block diagram illustrating a LIDAR system or circuit including time of flight and image sensors with common image registration in accordance with embodiments of the present disclosure.

FIGS. 2A and 2B are block diagrams illustrating common receiver optics that provide image registration for time of flight and image sensors in accordance with embodiments of the present disclosure.

FIG. 3 is a plan view block diagram illustrating an array of ToF sensors and an array of image sensors integrated on the same semiconductor substrate in accordance with embodiments of the present disclosure.

FIGS. 4A and 4B are plan view block diagrams illustrating examples of ToF and image sensors integrated on the same semiconductor substrate in accordance with embodiments of the present disclosure.

DETAILED DESCRIPTION OF EMBODIMENTS

Figure 5A:
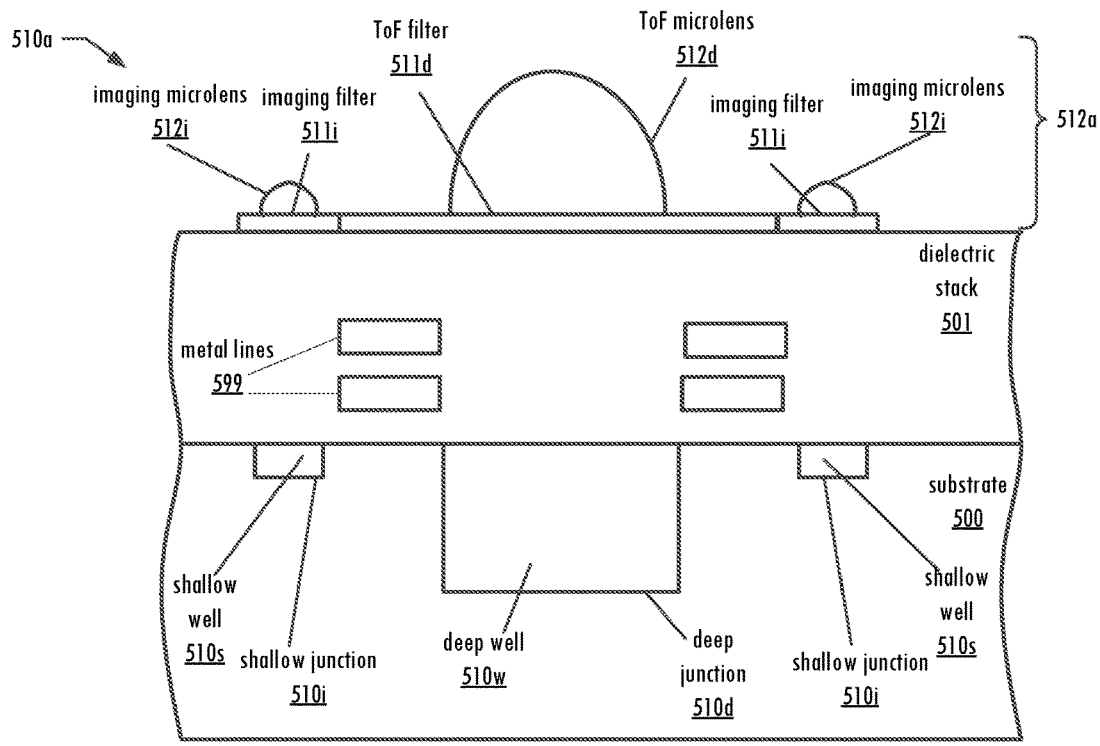
FIGS. 5A and 5B are cross-sectional views illustrating examples of ToF sensors and image sensors integrated on the same semiconductor substrate in accordance with embodiments of the present disclosure.

Many applications may benefit from imaging systems that acquire data from various modalities (e.g., lidar, traditional cameras, stereo cameras, and radar). For example, time-of-flight (ToF) sensors, which may be used in lidar, may collect data indicative of a range or distance of one or more targets (e.g., based on the timing and/or intensity patterns indicated by received echo signals), and thus, "depth" information (also referred to herein as a depth image) over the field of view (FoV) of the ToF sensor. Image sensors, which may be used in traditional still-picture or video cameras, may collect data indicative of visible features of one or more targets (including color, size, points, lines, etc.; also referred to herein as image information or an RGB image) in the field of view with higher resolution than some ToF sensors, but without depth information. Processing units can combine or merge the data from the various sensors to spatially and temporally correlate the image information with the depth information (also referred to herein as image registration), providing an integrated view of the field of view. However, such integration of data from various sensors is computationally intensive, and may thus be inefficient (e.g., in terms of processing power) and/or insufficient (e.g., in terms of processing time) for some applications, such as autonomous vehicle operations.

Integration of the various sensors themselves may also present challenges, for example, with respect to semiconductor processing (where different sensor types may require different processing conditions, such as impurity implantation depths) and/or data readout schemes (where different sensor types may require different logic circuitry). In particular, semiconductor p-n junctions can be used to construct photodiodes for detecting photons in the light reflected from the field of view, with an avalanche diode being one example of such photodiodes. Single-photon avalanche diodes (SPADs) may be used to detect single photons in time-of-flight sensing applications. In Geiger-mode SPADs, the output may be either a digital pulse corresponding to a photon-arrival event, or analog information corresponding to the precise time-of-arrival of the photon. In image sensors such as CMOS Active Pixel Sensors or CCDs, photon flux received by the sensing area is translated into collected charge and the collected charge is then read out as a detector output signal. Also, the surface area or footprint of some small CMOS SPAD pixels may be significantly larger than commercially-available CMOS Active Pixel Sensor (APS) pixels (e.g., up to 1000 times larger in some instances). This relatively large pixel area for a CMOS SPAD pixel may be in part due to the structure of the SPAD pixel, which can withstand high voltages and high current densities and be electrically isolated from the sensing circuitry.

Embodiments described herein may arise from recognition that integration of such different sensors may be aided by using shared optics to acquire information for both an image sensor and a time-of-flight sensor. This can offer the possibility for smaller, simpler and less expensive sensing systems. In embodiments described herein, time-of-flight sensors (also referred to herein as lidar sensors) may include one or more photodetectors (e.g., in a detector array), each of which provides an output signal (also referred to herein as a range or depth detection signal) indicative of a round trip propagation time of a light signal (e.g., from a laser or LED) incident thereon, or any other optical sensors that output detection signals indicative of depth information as described herein. Lidar sensors may include, without loss of generality, avalanche photodiodes reverse-biased below, at, or beyond breakdown, including SPADs or SiPMs (silicon photomultipliers); photon mixing devices; time-gated photodiodes; time-modulated CIS (CMOS Image Sensors); time-modulated CCDs (charge coupled devices); Doppler sensors; or any other suitable devices which can produce information for light-based ranging, in some embodiments based on detection of wavelengths of light in the near infrared or infrared wavelength ranges. In embodiments described herein, image sensors may include one or more photodetectors (e.g., in a detector array), each of which provides an output signal (also referred to herein as an image detection signal) indicative of the number of charges collected from light incident thereon over a period of time, or any other optical sensors that output detection signals indicative of image information as described herein. Image sensors are described primarily herein by way of example with reference to CMOS Image Sensors (CIS) without loss of generality. It will be understood that other image sensor technologies, such as (but not limited to) CCDs and non-silicon pixelated charge-integrating devices, can be similarly used interchangeably in embodiments described herein, in some embodiments based on detection of wavelengths of light at or below the near infrared or infrared wavelength ranges.

Further embodiments of the present disclosure are directed to integration of solid-state lidar sensors with image sensors. It will be understood that, without loss of generality and unless described otherwise, solid-state lidar can refer to any lidar where the emission used for sensing of the range and/or the sensing itself occurs in or is otherwise provided by one or more solid-state array devices, including but not limited to flash lidar sensors (direct or indirect time-of-flight), micro-electromechanical systems (MEMS) scanning systems, array sensors with scanning mirrors, and optical phase array systems. In some embodiments, a lidar emitter or emitter array can illuminate the whole or part of the field of view at one or more wavelengths (emission wavelengths). Integrated lidar devices and systems as described herein may include an emission source (for example, an emitter array), receiver optics (for example, at least one lens and/or a beam splitter or filter), and a detector including a ToF sensor and a CIS or other image sensor (for example, in a detector array). The emitter illuminates the field of view. Light from the field of view includes light from the emitter that is reflected from the field of view, and ambient light (a portion of which is also reflected from the field of view).

A LIDAR system may include an array of emitter elements and an array of detector elements, or a system having a single emitter element and an array of detector elements, or a system having an array of emitters and a single ToF detector element. As described herein, one or more emitters may define an emitter pixel, and one or more detectors (including ToF sensors and/or image sensors) may define a detector pixel. A flash LIDAR system may acquire images by emitting light from an array of emitters for short durations (pulses) over the FoV and detecting the reflected light emission by the array of detectors. Subregions of the array of emitter elements are arranged to direct light to (and subregions of the array of detector elements are arranged to receive light from) respective subregions within the FoV, which are also referred to herein as regions of interest (ROI).

An example of a LIDAR system or circuit 100 in accordance with embodiments of the present disclosure is shown in FIG. 1. The system 100 includes a control circuit 105, a timing circuit 106, an emitter array 115 including a plurality of emitters 115e, and a detector array 110 including a plurality of detectors 110d and/or 110i. The detectors 110d include time-of-flight sensors (for example, an array of single-photon detectors, such as SPADs). The detectors 110i include image sensors (for example, an array of CIS). One or more of the emitter elements 115e of the emitter array 115 may define emitter pixels that respectively emit a radiation pulse or continuous wave signal (for example, through a diffuser or optical filter 114) at a time and frequency controlled by a timing generator or driver circuit 116. In particular embodiments, the emitters 115e may be pulsed light sources, such as LEDs or lasers (such as vertical cavity surface emitting lasers (VCSELs)). Radiation is reflected back from a target 150, and is sensed by detector pixels defined by one or more detector elements 110*d*, 110*i* of the detector array 110. The control circuit 105 implements a pixel processor that measures the time of flight of the illumination pulse over the journey from emitter array 115 to target 150 and back to the detectors 110*d* of the detector array 110, using direct or indirect ToF measurement techniques.

In some embodiments, each of the emitter elements 115*e* in the emitter array 115 is connected to and controlled by a respective driver circuit 116. In other embodiments, respective groups of emitter elements 115*e* in the emitter array 115 (e.g., emitter elements 115*e* in spatial proximity to each other), may be connected to a same driver circuit 116. The driver circuit or circuitry 116 may include one or more driver transistors configured to control the modulation frequency, timing and amplitude of the optical emission signals that are output from the emitters 115*e*. The emission of optical signals from multiple emitters 115*e* provides a single image frame for the flash LIDAR system 100. The maximum optical power output of the emitters 115*e* may be selected to generate a signal-to-noise ratio of the echo signal from the farthest, least reflective target at the brightest background illumination conditions that can be detected in accordance with embodiments described herein. An optional filter 113 to control the emitted wavelengths of light and diffuser 114 to increase a field of view of the emitter array 115 are illustrated by way of example.

Light emission output from one or more of the emitters 115*e* impinges on and is reflected by one or more targets 150, and the reflected light is detected as an optical signal (also referred to herein as a return signal, echo signal, or echo) by one or more of the detectors 110*d* (e.g., via receiver optics 112), converted into an electrical signal representation (referred to herein as a detection signal), and processed (e.g., based on time of flight) to define a 3-D point cloud representation 170 of the field of view 190. Operations of LIDAR systems in accordance with embodiments of the present disclosure as described herein may be performed by one or more processors or controllers, such as the control circuit 105 of FIG. 1.

In the example of FIG. 1, the detector array 110 further includes a plurality of image sensors 110*i*. The receiver optics 112 are aligned such that it collects light from the spectra of both the active illumination (lidar emission by the emitters 115*e*) and ambient (with some acceptable aberrations), and such that it projects or directs light collected over the field of view 190 onto both a ToF sensor 110*d* and an image sensor 110*i*, each of which outputs a respective detection signal in response. The detection signals output from the ToF sensors 110*d* include depth information for the FoV 190 (also referred to herein as depth detection signals). The detection signals output from the image sensors 110*i* include image information for the FoV 190 (also referred to herein as image detection signals). The receiver optics 112 may include one or more lenses, beam splitters, and/or filters. For example, for the detector array 110 of FIG. 1, the receiver optics 112 may include an array of lenses that project light reflected by targets 150 in the field of view 190 onto the array 110 including the ToF sensors 110*d* and image sensors 110*i*.

According to embodiments of the present disclosure, the receiver optics 112 and/or the arrangement or layout of the ToF sensors 110*d* and image sensors 110*i* in the detector array 110 provide common image registration or correlation of features detected by the sensors 110*d* and 110*i* over the FoV 190, with reduced or without further processing required by the control circuit 105. That is, the depth information indicated by the detection signal output from a ToF sensor 110*d* is spatially and temporally correlated with the image information indicated by the detection signals output from a corresponding image sensor 110*i*, where the correspondence between each ToF sensor 110*d* and one or more image sensors 110*i* (or vice versa) is provided optically (by the redirection of light by the receiver optics 112) and/or spatially (by the relative arrangement of the sensors 110*d*, 110*i* in the detector array 110). The respective detection signals containing correlated information may be received at the control circuit 105, which may merge or register the correlated information with reduced processing requirements based on the known (optical and/or spatial) correspondence between a ToF sensor 110*d* and the correlated image sensor(s) 110*i*. In some embodiments, the image sensors 110*i* may be configured to implement a RGB (Red-Green-Blue) 2D camera that provides RGB images or information, and the ToF sensors 110*d* may provide depth images or information. As such, correlation between data provided by different sensors 110*d*, 110*i* as described herein may allow for the system 100 to provide depth information associated with every pixel in the RGB camera, with reduced (or none of the) processing or computational overhead that is typically required to register the image information and depth information from the respective detection signals output by the image sensors 110*i* and the ToF sensors 110*d*.

Examples of common receiver optics for time of flight and image sensors in accordance with embodiments of the present disclosure are shown in FIGS. 2A and 2B. In particular, FIG. 2A illustrates a functional arrangement of the receiver optics 212 (including lens(es) 212*l* and beam splitter/filter(s) 211) and sensors 210*i*, 210*d*, while FIG. 2B illustrates an example implementation of the receiver optics 212 and sensors 210*i*, 210*d* in a monolithic or unitary module including prisms 212*i*, 212*d*, which may facilitate alignment of the sensors 210*i*, 210*d* with the common receiver optics 212. The receiver optics 212 and sensors 210*i*, 210*d* may represent or correspond to the receiver optics 112 and sensors 110*i*, 110*d* of FIG. 1, respectively, in some embodiments.

As shown in FIGS. 2A and 2B, incident light from a field of view (e.g., FoV 190) is collected by a common optical element or elements 212*l*, and is directed via a beam splitter or filter 211 such that some of the light falls onto the ToF sensor 210*d* and some of the light falls onto the RGB image sensor 210*i*, in some instances with minimal leakage outside the two sensors 210*d*, 210*i*. In the examples of FIGS. 2A and 2B, light in the visible and/or near-infrared portions of the electromagnetic spectrum (e.g., light having wavelengths of between about 380 nanometers (nm) to about 750 nm), which may be indicative of visible features of a target, is directed to the image sensor 210*i*. Light having wavelengths of greater than the visible and/or near-infrared portions of the electromagnetic spectrum (e.g., light having wavelengths of greater than about 750 nm, for instance, 940 nm), which may correspond to the optical signals output from one or more emitters 115*e* of the lidar system 100, is directed to the ToF sensor 210*d*. In particular, the emitter(s) 115*e* may be configured to output optical signals having wavelengths greater than that of visible light, which may be reflected from the target(s) 150 in the FoV 190 and received as an echo signal in the light incident on the receiver optics 212. The lens 212*l* and beam splitter or filter 211 may thus direct the greater than visible and/or near-infrared wavelength light (illustrated as a first wavelength range) to the ToF sensor 210*d*, while light within the visible and/or near-infrared spectrum (illustrated as a second wavelength range) is directed to the image sensor 210*i*, with temporal and spatial correlation. The first and second wavelength ranges may overlap in some embodiments.

The outputs of both sensors 210*d* and 210*i* may be combined or fused using a processor, such as the control circuit 105, to define the 3-D point cloud representation 170 of the field of view. Because common receiver optics 212 are used to direct incident light over the FoV to both sensors 210*d* and 210*i*, processing operations to provide image registration or correlation between features detected by the image sensor 210*i* and the ToF sensor 210*d* over the FoV may not be required. That is, the receiver optics 212 can optically correlate the ToF sensor 210*d* with the image sensor 210*i*, such that the respective detection signals output therefrom include depth information and image information, respectively, which are spatially and temporally correlated. This may reduce processing requirements, thereby allowing for faster, less expensive systems. In the examples of FIGS. 2A and 2B, the sensors 210*i* and 210*d* may be, but are not necessarily, included in the same detector array. In further embodiments described herein, the ToF sensor 210*d* and the image sensor 210*i* may be integrated on a same die, thereby allowing for image registration while reducing the likelihood of misalignment of the lens 212, beam splitter or filter 211, and/or prisms 212*i*, 212*d*.

In some embodiments, the beam splitter or filter 211 may be a spectral filter that is provided in the optical path of the two sensors 210*d*, 210*i*. The filter 211 can be a bandpass filter containing the emission wavelength, that is, configured to permit light of a wavelength range including the light output from the lidar emission source (e.g., the emitter array 115) to pass therethrough, such that ambient light may be removed to provide a sufficiently high signal-to-noise ratio in the ToF sensor 210*d* and in the image sensor 210*i*. In the embodiments of FIGS. 2A and 2B, the filter 211 is arranged in front of the ToF sensor 210*d* (i.e., between the ToF sensor 210*d* and the lens 2121), but not the image sensor 210*i* (i.e., such that the light incident on the image sensor 210*i* does not first pass through the filter 211). Thus, the light may be directed to the image sensor 210*i* unfiltered, such that the image sensor 210*i* can capture more photons. As compared to the ToF sensor 210*d*, the image sensor 210*i* may be less dependent on the reflectivity of the objects in the emission wavelength band, and less susceptible to being saturated or "blinded" by the reflected light from highly-reflective objects that may be close to the detector (or such objects which reflect a relatively large portion of the emitter's light, such as retroreflectors).

While illustrated in FIGS. 2A and 2B with reference to a single filter configuration, embodiments of the present disclosure are not limited to the illustrated configurations, but rather may include other configurations where common receiver optics 212 are used to direct incident light onto both a ToF sensor and an image sensor. In some embodiments, a first filter 211 may be arranged in front of the ToF sensor 210*d* as described above, and a second filter may be arranged in front of the image sensor 210*i*, for example to preferentially image a particular optical band/wavelength range or to preferentially block particular optical band/wavelength range. In some embodiments, a combination of filters may be arranged in front of the image sensor 210*i* to allow RGB (red-green-blue) or multispectral imaging.

Likewise, in some embodiments the beam splitter or filter 211 may be a dichroic beam splitter that is provided in the optical path of the two sensors 210*d*, 210*i*, so as to direct light of one or more spectral bands or wavelength ranges to a first direction of sensor 210*d* and light of other bands or wavelength ranges to a second direction of sensor 210*i*. In some embodiments, light of a wavelength range including the light output from the lidar emission source may be reflected to the ToF sensor 210*d*, and light of one or more other wavelength ranges may be reflected to the image sensor 210*i*. In some embodiments, a dichroic mirror may be used as or to replace the beam splitter 211. More generally, while illustrated with reference to a particular elements in FIGS. 2A and 2B, it will be understood that embodiments of the present disclosure are not limited to the illustrated elements, and may include other elements or configurations that direct incident light onto both a ToF sensor 210*d* and an image sensor 210*i*, and in some instances, direct light of a first wavelength range to the ToF sensor 210*d* and light of a second/different wavelength range to the image sensor 210*i*.

Referring again to FIG. 1, in some embodiments the control circuit 105 may include at least one processor that is configured to identify objects or targets 150 in the FoV 190 based on one or both of the three-dimensional or depth information received from the ToF sensor 110*d* and the spectral information received from the image sensor 110*i*, for example, based on brightness, two- or three-dimensional shape, reflectivity, and/or color indicated by the depth detection signals and image detection signals. Similarly, the processor may be configured to track the objects or targets 150 based on this or other data indicated by the detection signals from one or both of the ToF sensor 110*d* and the image sensor 110*i*. In some embodiments, the values read from the detection signals from one or both of the ToF sensor 110*d* and the image sensor 110*i* may be used by the processor to assign a confidence level to range measurements calculated from the detection signals.

In some embodiments, in addition to the lidar emitters 115*e* that emit light of a first wavelength range for detection by the ToF sensors 110*d* to perform ranging measurements, the system 100 may include one or more second or additional emitters that emit light of a second/different wavelength range to illuminate the field of view 190 for the image sensor 110*i*. The receiver optics 112 and/or filter 111 may likewise be configured to direct incident optical signals of the first wavelength range to the ToF sensors 110*d*, and incident optical signals of the second wavelength range to the image sensors 110*i*. In some embodiments, the ToF sensor 110*d* may be configured to be sufficiently sensitive to the light of the first wavelength range output from the emitters 115*e*, while the image sensor 110*i* may be configured to be sufficiently insensitive to the light of the first wavelength range output from the emitters 115*e*, for example, by arranging respective wavelength-selective filters in front of the ToF sensor 110*d* and the image sensor 110*i*. In some embodiments, the second or additional emitters may be configured such that the light of the second wavelength range output therefrom is sufficiently undetectable by the ToF sensor 110*d*, with or without the filter 111. "Sufficient" sensitivity or detection as described herein may refer to configurations that can distinguish between the image sensor and ToF-specific emission and detection wavelength ranges.

Still referring to FIG. 1, the emitter array 115 may include an array of VCSELs as the emitter elements 115*e*. In some embodiments, the driver circuit 116 may be configured to drive the array 115 of VCSELs 115*e* at a same intensity or output power level, that is, such that the emission of each of the VCSELs 115*e* is substantially uniform in intensity. For example, the VCSEL array 115 may be pulsed and the average and peak power of one or more (or all) VCSELs 115e in the array 115 may be substantially similar or identical. The driver circuit 116 may be configured to drive the array 115 of VCSELs 115e at multiple intensities or different output power levels (including different, non-zero output power levels), that is, such that the respective emissions of the VCSELs 115e are non-uniform in intensity.

In some embodiments, the emitter array 115 may be divided into respective sub-regions including subsets of emitters 115e, and each of the subsets of emitters 115e may be driven by a respective driver circuit 116. The respective driver circuits 116 may be configured to drive the emitters 115e of a respective sub-region with a respective intensity or output power, that is, to provide output signals that result in respective emission intensities for respective sub-regions of the emitter array 115. In some embodiments the respective intensities or output powers of each sub-region of the emitter array 115 may be determined by the control circuit 105 or other processor, for example, based on feedback detection signals output from spatially-correlated detectors 110d and/or 110i of the detector array 110. That is, the control circuit 105 or processor may be configured to calculate the required drive intensity per region or globally for the array 115 based on the intensity of return signals detected by detectors 110d and/or 110i of the detector array 110 over the field of view 190.

The following examples are provided to illustrate advantages of configurations that provide image registration between ToF sensors 110d and image sensors 110i according to some embodiments of the present disclosure. In one example, when the lidar system 100 receives return signals which are relatively weak in a particular region of the FoV 190 (as indicated by detection signals from detectors 110d and/or 110i located in a corresponding region of the detector array 110), the control circuit 105 or processor may output control signals to the driver circuit 116 to provide drive signals that result in higher intensity emission through corresponding subsets of emitters 115e that are arranged to illuminate that particular region of the FoV 190.

In another example, the image sensors 110i facing a particular region of the FoV 190 may output detection signals indicating a target 150 that may have been undetected by the ToF sensors 110d, and the control circuit 105 or processor may output control signals to the driver circuit 116 to operate subsets of the emitters 115e that are arranged to illuminate that particular region of the FoV 190 to increase emission power. For instance, the control circuit 105 or processor may fuse or combine the data from both the ToF sensors 110d and the image sensors 110i (which may have detected the target 150) to identify the target 150 that was undetected by the ToF sensors 110d, and may output control signals to the driver circuit 116 to adjust emission power for one or more subsets of emitters 115e in response. In one example, a reflected signal from a highly reflective target 150 may saturate the ToF sensors 110d, but may be visible or detectable by the image sensors 110i, and the control circuit 105 or processor may output control signals to the driver circuit 116 to operate subsets of the emitters 115e that are arranged to illuminate the portion or region of the FoV 190 including the highly reflective target 150 to reduce emission power in order to un-saturate the reflected signal.

In some embodiments, the lidar system 100 may be a flash lidar system, whereby the emitter array 115 may be driven to operate groups of the emitters 115e simultaneously or in parallel. In some embodiments, the lidar system 100 may be a solid-state scanning lidar system, whereby the emitter array 115 may be driven to sequentially operate the emitters 115e of respective rows or columns in one or more sequences such that the optical signals output therefrom provide a scanning effect. In some embodiments, the lidar system 100 may be a non-solid-state lidar.

FIGS. 3-7 illustrate embodiments of detector arrays where the image sensors and ToF sensors are collocated on the same semiconductor substrate (e.g., on the same chip or die) to provide image registration between features detected by the image sensors and the ToF sensors over the FoV. Some example configurations may be implemented without beam-splitting optics, thereby providing systems that are smaller, cheaper, easier to align (by avoiding misalignment of the beam splitter), and operable with less power consumption. In some embodiments, devices and methods for monolithically integrating an RGB camera into a LIDAR ToF camera on the same chip or substrate are provided. Furthermore, embodiments described herein are directed not only to the detector devices themselves, but also flash lidar systems including such detector devices in combination with an array of VCSELs or other emitters, in some instances addressable and assembled on the same substrate, for example, using Micro Transfer Printing (MTP) techniques.

As shown in plan view in FIG. 3, some embodiments described herein provide detector arrays 310 including imaging pixels 310i interspersed between ToF pixels 310p, such as indirect ToF (iToF) pixels. Multiple image sensors (e.g., 110i, 210i) and ToF sensors (e.g., 110d, 210d) may define a respective imaging pixel 310i and ToF pixel 310d, respectively. iToF detector arrangements in particular can pose some challenges, for example, as iToF pixels may operate at lower voltages and typically do not have the guard ring structures associated with the detectors (e.g., SPAD devices) of direct ToF pixels. Also, in general, ToF pixels 310d may be larger (in one or more dimensions) than some imaging pixels 310i. For example, some indirect ToF pixels may be approximately 17 microns×17 microns (289 square microns) in surface area, some direct ToF pixels may be approximately 40 microns×40 microns (1600 square microns) in surface area, while some CIS pixels may be approximately 1.4 microns×1.4 microns (1.96 square microns) in surface area. Thus, the surface area of the ToF pixels 310d may be between 100 times to 1000 times larger than that of the imaging pixels 310i in some embodiments.

In some embodiments, a device including an array of ToF pixels on the same semiconductor substrate as an array of CIS pixels may be manufactured to provide an integrated sensor die with a hybrid CIS/ToF detector array. More generally, as shown in FIG. 3, a detector array 310 may include an array of imaging pixels 310i and ToF pixels 310d. The integrated sensor die is laid out such that the imaging pixels 310i are interspersed among the ToF pixels 310d in the array 310. That is, the arrangement of the pixels 310d, 310i in the array spatially correlates each ToF pixel 310d with one or more imaging pixels 310i (e.g., as sub-pixels) such that the respective detection signals output therefrom include depth information and image information, respectively, that are spatially and temporally correlated.

In the examples of FIGS. 3 and 4, four imaging pixels 310i are laid out symmetrically around each ToF pixel 310d, but fewer or more pixels 310i and/or 310d and or asymmetric arrangements thereof may be used. Processing control circuitry 305 may also be provided in adjacent areas on the same semiconductor substrate (i.e., on-chip), or on one or more different substrates (i.e., off-chip, as indicated by the dotted line in FIG. 3). The processing control circuitry 305 may represent or correspond to the control circuit 105 and/or the associated driver 116 and timing 106 circuits of FIG. 1 in some embodiments. The processing control circuitry 305 may be configured to register or correlate features indicated by the respective detection signals output from a ToF pixel 310$d$ and the correlated imaging pixel(s) 310$i$, based on a known correspondence of the pixels 310$d$, 310$i$ in the array 310. The input/output (I/O) pads 399 may be used to couple the detector array 310 to one or more external devices. For example, as the imaging pixels 310$i$ may have different readout requirements than the ToF pixels 310$d$, the I/O pads may provide respective detection signals from the imaging pixels 310$i$ and the ToF pixels 310$d$ to different readout circuits (e.g., on one or more different wafers or substrates).

In some embodiments, subsets or all of the pixels 310$i$, 310$d$ may share power supply lines. In some embodiments, subsets or all of the imaging pixels 310$i$ may share first power supply lines, while subsets or all of the ToF pixels 310$d$ may share second power supply lines, as the imaging pixels 310$i$ may have different power requirements than the ToF pixels 310$d$. For example, using SPAD pixels for the ToF pixels 310$d$ may require higher voltages than using CIS pixels for the imaging pixels 310$i$. Also, separate supply lines for the pixels 310$d$, 310$i$ may be used for electrical noise isolation, as ToF pixels 310$d$ may be more sensitive to supply noise than imaging pixels 310$i$.

FIGS. 4A and 4B are plan view block diagrams illustrating examples of integrated ToF and imaging pixels 410$a$ and 410$b$ in accordance with embodiments of the present disclosure. The pixels 410$a$ and 410$b$ may each represent or correspond to plan views of ToF pixels 310$d$ and adjacent imaging pixels 310$i$ in the detector array 310 of FIG. 3 in some embodiments. In particular, FIG. 4A illustrates an example plan view layout for a pixel 410$a$ that provides visible light imaging and depth information (also referred to herein as RGB+D), while FIG. 4B illustrates an example plan view layout for a pixel 410$b$ that provides visible plus infrared (IR) light imaging and depth information (also referred to herein as RGBI+D). Similar to the arrangement shown in FIG. 3, the pixels 410$a$, 410$b$ each include a ToF pixel (e.g., pixel 310$d$) surrounded by four imaging sub-pixels (e.g., pixels 310$i$), illustrated at respective corners of the ToF pixel by way of example, such that the pixels 410$a$, 410$b$ may be arranged in an array (e.g., the array 310).

In the examples of FIGS. 4A and 4B, the ToF pixels and imaging pixels include respective wavelength-selective filters 411$r$, 411$g$, 411$b$, 411$d$, and/or 411$i$ (collectively 411) overlying or otherwise arranged in the optical path of the ToF and imaging pixels to allow for detection of the desired wavelengths of light. In particular, in the RGB+D pixel 410$a$ of FIG. 4A, a filter 411$d$ that is configured to allow light of wavelengths corresponding to the near-infrared (NIR) wavelength band or range to pass therethrough is arranged above the ToF pixel. The NIR wavelength range may include wavelengths of about 780 nm to about 2500 nm. Filters 411$r$, 411$g$, 411$g$, and 411$b$, which are configured to allow light of wavelengths corresponding to the Red, Green, Green, and Blue (RGGB) wavelength bands or ranges to pass therethrough, are arranged above the four imaging sub-pixels, respectively. The red wavelength range may include wavelengths of about 615 nm to about 750 nm; the green wavelength range may include wavelengths of about 495 nm to about 580 nm; and the blue wavelength range may include wavelengths of about 415 nm to about 490 nm. The pixel 410$a$ may include two green-sensitive filters 411$g$ overlying two of the imaging pixels to collect more information or otherwise provide greater sensitivity to light in the green wavelength range of the visible spectrum, which may contain more energy in response to illumination of the FoV by visible light sources.

Similarly, in the RGBI+D pixel 410$b$ of FIG. 4B, a filter 411$d$ that is configured to allow light of wavelengths corresponding to the infrared (IR) or near infrared (NIR) wavelength band or range to pass therethrough is arranged above the ToF pixel, and filters 411$r$, 411$g$, and 411$b$ that are configured to allow light of wavelengths corresponding to the Red, Green, and Blue (RGB) wavelength bands or ranges to pass therethrough, are arranged above three of the four imaging sub-pixels, respectively. The pixel 410$b$ may further include IR or NIR filters 411$i$ overlying the fourth imaging sub-pixel, to collect information or otherwise provide sensitivity to light in the infrared range of the visible spectrum, which may allow for imaging in the absence of illumination of the FoV by visible light (e.g., for night vision or other low-light or no-light imaging). Thus, the pixel 410$b$ may detect color (RGB), infrared (I), and depth (D) information.

In integrating ToF and imaging pixels on a same substrate, it is understood that some lidar systems may include emitters that emit light in the NIR wavelength range or higher, for example, at wavelengths of greater than about 780 nm (e.g., about 850 nm, 905 nm or 940 nm), and that silicon has a very low absorption coefficient in these wavelengths. Imaging pixels 310$i$ may provide information on visible wavelength photons, for example, in a wavelength range of about 500 nm to about 750 nm, where silicon has a relatively high absorption coefficient. Some CIS arrays may be sensitive to visible and NIR or near ultraviolet (UV) wavelengths (e.g., red, green, blue, ultraviolet (RGBU)), the pixels of which may integrate charge to provide an image, but may not be configured to provide range. When integrating ToF and imaging pixels on a same substrate in accordance with further embodiments described herein, the imaging pixels may be formed with relatively shallow p-n or p-i-n junctions, while lidar ToF pixels may be formed with deeper, wider p-n or p-i-n junctions. Junction regions may be generally used herein to refer to p-n or p-i-n junctions.

Figure 5B:
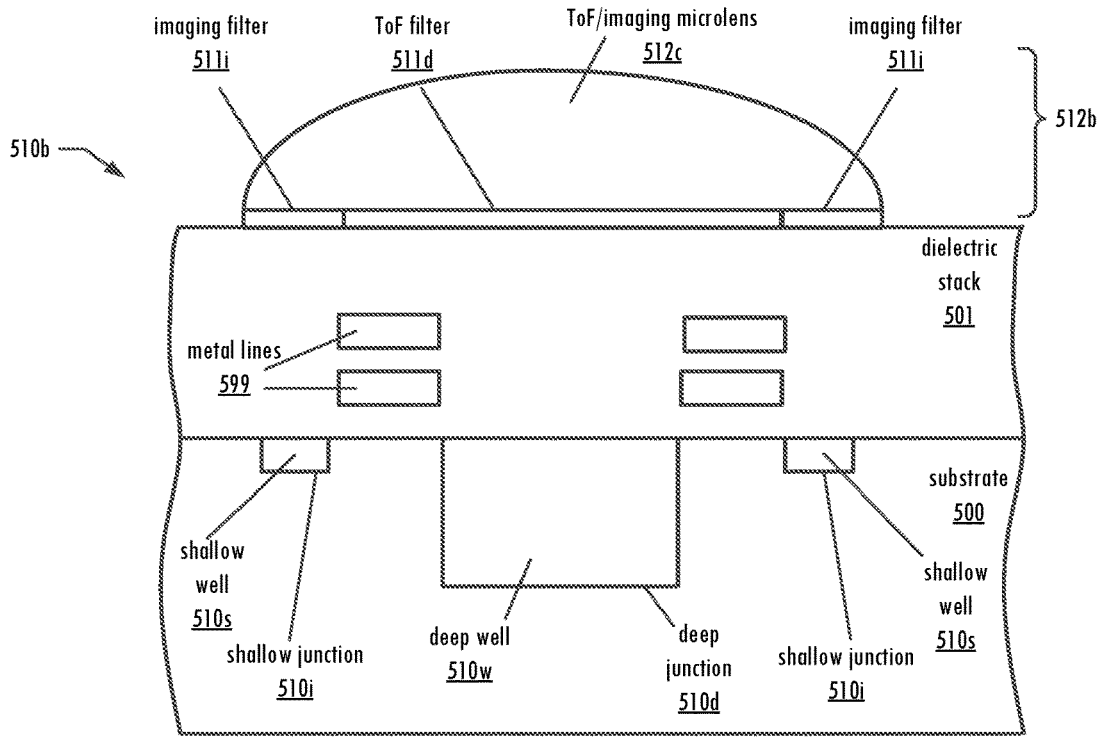

FIGS. 5A and 5B are cross-sectional views illustrating examples 510$a$ and 510$b$ of ToF sensors and image sensors integrated on the same semiconductor substrate 500 in accordance with embodiments of the present disclosure. The pixels 510$a$ and 510$b$ of FIGS. 5A and 5B may each include a ToF sensor 510$d$ symmetrically arranged between adjacent imaging sensors 510$i$; however, it will be understood that fewer/more sensors 510$d$, 510$i$ and/or asymmetric arrangements may be used. The ToF sensor 510$d$ and adjacent imaging sensors 510$i$ may represent or correspond to cross-sections of a ToF pixel 310$d$ and adjacent imaging pixels 310$i$ of FIG. 3, respectively, in some embodiments. The ToF sensor 510$d$ and adjacent imaging sensors 510$i$ may represent or correspond to cross-sections of the pixels 410$a$ or 410$b$ of FIG. 4A or 4B in some embodiments, and may include wavelength selective imaging filters 511$i$ and ToF filters 511$d$ similar to the imaging filters 411$r$/411$g$/411$b$/411$i$ and ToF filter 411$d$ of FIGS. 4A and 4B.

As shown in FIGS. 5A and 5B, dopants of an opposite conductivity type (p-type or n-type) than the substrate 500 are provided in the substrate 500 (e.g., by implantation) to form relatively deeper, wider well regions 510$w$ (defining photodiodes of the ToF sensors 510$d$), and relatively shallower, narrower well regions 510$s$ (defining photodiodes of the imaging sensors 510$i$). For example, the substrate 500 may be a p-type semiconductor material, and the well regions 510$w$, 510$s$ may be formed by implanting n-type dopants into the surface of the substrate 500 with differing implantation energies to provide junction regions of the ToF sensors 510*d* and the imaging sensors 510*i* with differing depths. Dielectric layer(s) and metal layers may be formed on the surface of the substrate 500 to define the dielectric stack 501 and metal lines 599, respectively. The metal lines 599 may implement connections for routing signals to and/or from the ToF sensors 510*d* and imaging sensors 510*i*.

Still referring to FIGS. 5A and 5B, a matrix or array of microlenses 512*a* and 512*b* may be applied to the hybrid imaging/ToF array as receiver optics. For example, as shown in FIG. 5A, the array of microlenses 512*a* may include microlenses 512*i* and 512*d* that are aligned with (in plan view) and sized differently for the imaging sensors 510*i* and the ToF sensors 510*d*, respectively. In particular, the ToF microlenses 512*d* may be formed to be wider and taller than the imaging microlenses 512*i*, in order to improve or optimize incident light collection and direction of the incident light to the wider and deeper junction regions of the ToF sensors 510*d* as compared to the narrower and shallower junction regions of the imaging sensors 510*i*.

In some embodiments, the array of microlenses 512*b* may include a common microlens 512*c* for multiple CIS pixels and ToF pixels, as shown in FIG. 5B. In particular, the ToF/imaging microlenses 512*c* may be formed with respective regions that direct incident light to both the wider and deeper junction regions of the ToF sensors 510*d* and the narrower and shallower junction regions of the imaging sensors 510*i*.

While illustrated in FIGS. 5A and 5B with reference to frontside illumination schemes where the microlenses 512 are provided on a surface of the dielectric stack 501 with the metal lines 599 between the microlenses 512 and the photodiodes formed in the substrate 500, it will be understood that the array of microlenses 512 may alternatively be implemented on the opposite surface of the substrate 500 in a backside illumination scheme, with the photodiodes and substrate 500 between the microlenses 512 and the metal lines 599 in some embodiments of the present disclosure. Also, while not shown, isolation structures may be implemented in or on regions of the substrate 500 to separate the junction regions of ToF sensors 510*d* from junction regions of the imaging sensors 510*i*, to reduce the probability of photogenerated charges diffusing between regions 510*d* and 510*i*. For example, the isolation structures may be implemented as isolating trenches between p-n junctions of ToF sensors 510*d* and *p-n* junctions of the imaging sensors 510*i*. The isolating trenches between the junction regions of the ToF sensors 510*d* and the junction regions of the imaging sensors 510*i* may be filled with one or more dielectric materials. In some embodiments the isolating trenches may have respective depths (relative to the surface of the substrate 500) that are at least as deep as the junction regions of the ToF sensors 510*d*. In some embodiments, the isolation trenches may be passivated to reduce or minimize the formation of defects in the crystalline structure of the substrate 500, which may increase noise. In some embodiments, the isolation structures, trenches or otherwise, may surround the ToF sensors 510*d* or the junction regions thereof.

Figure 6:
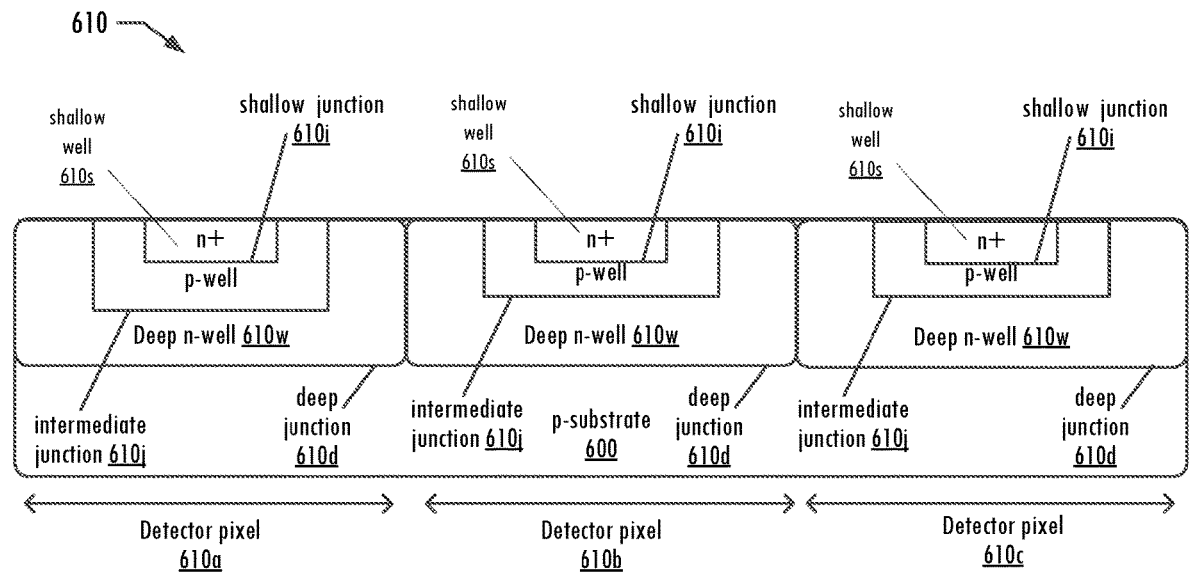
FIG. 6 is a cross-sectional view illustrating examples of ToF sensors and image sensors integrated on the same semiconductor substrate in accordance with embodiments of the present disclosure.

In some embodiments, the shallower imaging pixel junction regions may be formed directly above or overlapping in plan view with the deeper ToF pixel junction regions in an array. FIG. 6 is a cross-sectional view illustrating examples of an integrated sensor die with a detector array 610 including ToF sensors 610*d* and image sensors 610*i* integrated on the same semiconductor substrate 600 in accordance with embodiments of the present disclosure. The detector array 610 illustrates three side-by-side detector pixels 610*a*, 610*b*, 610*c*, but it will be understood that the array 610 may include additional pixels in one or more dimensions, for example, to define rows and columns similar to the arrangement of the detector array of FIG. 3.

As shown in FIG. 6, dopants of an opposite conductivity type (p-type or n-type) than the substrate 600 are provided in the substrate (e.g., by implantation) to form deeper, wider well regions 610*w* (defining photodiodes of the ToF sensors 610*d*), and shallower, narrower well regions 610*s* (defining photodiodes of the imaging sensors 610*i*). For example and without loss of generality, a shallow n+ region 610*s* defines a p-n junction with a first p-well junction 610*i* to form a photodiode of an imaging sensor 610*i* for detection of photons in the visible wavelength range, whereas a deep n-well region 610*w* defines a p-n junction with the p-type substrate 600 to form a photodiode of a ToF pixel for detection of photons in the NIR wavelength range. As the sensors 610*i* and 610*d* may be sensitive to different wavelengths of light, the stacked arrangement of the sensors 610*i* on the sensors 610*d* may allow the visible wavelength photons to be detected by the imaging sensors 610*i*, while the photons of greater wavelengths may be transmitted to the underlying ToF sensors 610*d*.

In the example of FIG. 6, the substrate 600 is a p-type semiconductor material, and the well regions 610*w*, 610*s* may be formed by sequentially implanting n-type dopants into the surface of the substrate 600 with differing implantation energies to provide the junction regions of the ToF sensors 610*d* and the imaging sensors 610*i* with differing depths. An intermediate junction region 610*j* is provided between the shallow junction region of the imaging sensors 610*i* and the deep junction region of the ToF sensors 610*d*. The intermediate junction regions 610*j* may act as isolation structures that provide electrical isolation between the underlying ToF sensors 610*d* and the overlying imaging sensors 610*i* stacked thereon, to reduce or prevent migration of charge carriers from the shallow junction region of the imaging sensors 610*i* to the deep junction region of the ToF sensors 610*d*, or vice versa.

In some embodiments, a readout node of the shallow junction region of the imaging sensor 610*i* is electrically connected to a sensing, transfer, and/or reset node. For example, the readout node of the shallow junction region of the imaging sensor 610*i* may be connected to the gate of a sense follower MOSFET. Likewise, in some embodiments, the sensing node of the deep junction region of the ToF sensor 610*d* may be electrically connected to a sensing, transfer or reset node. For example, if the deep p-n junction of the ToF sensor 610*d* is part of a SPAD, the deep n-well (DNW) 610*w* may be electrically connected to the gate of a MOSFET for further processing. The readout MOSFETs and/or other circuitry may be provided on a different wafer or substrate than the substrate 600 in some embodiments.

Similar to the embodiments of FIGS. 5A and 5B, dielectric layer(s) and metal layers may be formed on the surface of the substrate 600 to define the dielectric stack and metal lines, respectively. Also, similar to the embodiments of FIGS. 5A and 5B, receiver optics (e.g., as a matrix or array of microlenses) may be applied to the hybrid imaging/ToF array 610, in a frontside or backside illumination arrangement. Isolation structures (in addition to the junction regions 610*i*) may also be implemented in or on regions of the substrate 600 between adjacent ToF/imaging pixel stacks 610*a*, 610*b*, and 610*c* (or surrounding respective stacks), to reduce the probability of photogenerated charges diffusing between the junction regions of the stacked detector pixels 610a, 610b, and 610c.

Accordingly, in some embodiments, an RGB camera may be monolithically integrated into a LIDAR ToF camera on the same chip, with one or more CIS photodiodes formed over one or more ToF photodiodes. While illustrated with reference to particular conductivity types of particular regions in the examples of FIGS. 5A, 5B, and 6, it will be understood that embodiments of the present disclosure are not limited to these examples, and that the opposite conductivity types may be used. That is, while illustrated with reference to a p-substrate and n-dopants, an n-substrate with p-dopants may be used to form the deep junction regions of the ToF sensors 610d and the shallow junction regions of the imaging sensors 610i stacked thereon in some embodiments.

Figure 7:
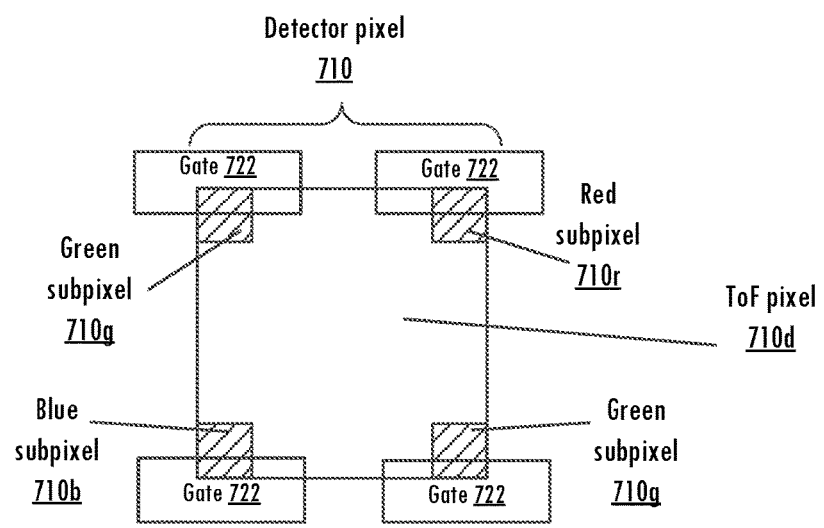
FIG. 7 is a plan view block diagram illustrating further examples of ToF and image sensors integrated on the same semiconductor substrate in accordance with embodiments of the present disclosure.

FIG. 7 is a plan view block diagram illustrating further examples of integrated ToF and image sensors in accordance with embodiments of the present disclosure. The detector pixel 710 of FIG. 7 may represent or correspond to plan views of ToF pixels 310d and adjacent imaging pixels 310i in the detector array 310 of FIG. 3, the detector pixels 410a or 410b of FIG. 4A or 4B, the detector pixels 510a or 510b of FIG. 5A or 5B, or any of the detector pixels 610a-610c of FIG. 6. In particular, in the example shown in FIG. 7, the detector pixel 710 may be similar to the detector pixel 410a of FIG. 4A, to provide an RGB+D pixel including a ToF sensor 710d that is sensitive to light of wavelengths corresponding to the near-infrared (NIR) wavelength band or range, with image sensors 710r, 710g, 710g, and 710b defining imaging sub-pixels that are sensitive to wavelengths corresponding to the Red, Green, Green, and Blue (RGGB) wavelength bands or ranges, respectively. Alternatively, the detector pixel 710 may be similar to the detector pixel 410b of FIG. 4B, to provide an RGBI+D pixel, with one of the green sub-pixels 710g replaced with a sub-pixel that is sensitive to wavelengths of the IR or NIR wavelength bands or ranges.

The detector pixel 710 further includes gate structures 722 (such as photogates or transfer gates) formed over the active area or around the active area of one or more of the junctions of the ToF sensor 710d and/or image sensors 710r, 710g, 710g, and 710b, for example, to modulate the depth of the depletion range, to control the electric field, and/or to transfer charges to adjoining wells or capacitors. In the example of FIG. 7, the gate structures 722 are implemented at a periphery of the ToF sensor 710d and the surrounding image sensors 710r, 710g, 710g, and 710b by way of example, but it will be understood that other arrangements may be used. In some embodiments, the gate structures 722 may be transparent to NIR wavelengths of light, but may not transparent to visible wavelengths of light (or vice versa). When the gate structures 722 are transparent to NIR wavelengths but not to visible wavelengths, visible photon absorption and detection by the image sensors 710r, 710g, 710g, and 710b may be localized and defined by the gate structures 722 (or other electrodes or floating structures) while infrared photons may be transmitted through the gate structures 722 and may be detected across the deep, underlying junctions of the ToF pixels 711d. That is, the gate structures 722 may be arranged overlapping one or more of the junctions of the ToF sensor 710d and/or image sensors 710r, 710g, 710g, and 710b in plan view, with wavelength transmittance characteristics selected or otherwise configured to direct light of corresponding wavelength ranges to the underlying ToF or image sensors that are sensitive to those wavelength ranges.

As noted above, readout requirements for the ToF pixels and the imaging pixels of integrated detector arrays described herein may be the same or may differ, and the control circuits (e.g., 105, 305) described herein may be configured to operate the detectors in accordance with the same or differing readout requirements. In some embodiments, the readout of the ToF pixels may be implemented using a global shutter scheme, such that the ToF pixels of the detector array are operated substantially simultaneously to capture a "snapshot" of the FoV. In some embodiments, the readout of the imaging pixels is implemented using a global shutter scheme. In some embodiments, the readout of the ToF pixels is implemented using a rolling shutter scheme, such that the ToF pixels of the detector array are operated sequentially to "scan" over the FoV. In some embodiments, the readout of the imaging pixels is implemented using a rolling shutter scheme. That is, any combination of global and rolling shutter schemes may be used for readout of the ToF pixels and the imaging pixels in integrated detectors as described herein. As discussed above with reference to FIG. 3, I/O pads (e.g., 399) may provide the respective detection signals from the imaging pixels and the ToF pixels to different readout circuits, in some embodiments on one or more different wafers or substrates.

Also, the frame rate (e.g., the rate of sampling a point in the 3D FoV) for the ToF pixels and the imaging pixels as described herein may be approximately the same or may differ, and the control circuits (e.g., 105, 305) described herein may be configured to operate the detectors in accordance with the same or differing frame rates. For example, in the case of relatively bright sunlight and relatively dim targets in the field of view, the imaging pixels may be operated at a higher frame rate, while the ToF pixels may be operated at a lower frame rate.

The control circuits (e.g., 105, 305) may also be configured to perform row-wise and/or column-wise operations per-region of any of the detector arrays described herein, where a region may include one or more pixels in the detector array. In some embodiments, readout from a hybrid image sensor/ToF sensor detector may be analog, and processing may be performed off-chip. In some embodiments, a column-wise analog to digital converter (ADC) array may be implemented to digitize the readout from the ToF pixels, on-chip or off-chip. Similarly, in some embodiments, a row-wise ADC array may be implemented on-chip or off-chip. In some embodiments, the ADCs may be shared between the ToF and imaging pixels. In some embodiments, one column- or row-wise ADC array may be dedicated to the imaging pixels, and one ADC or time to digital converter (TDC) array may be dedicated to the ToF pixels. In some embodiments, the ToF pixels may include an ADC or a TDC. In some embodiments, an on-chip or off-chip processor may be configured to register or correlate features sensed by an array of imaging pixels with ranges sensed by an array of ToF pixels over the field of view, based on the known correspondence between subsets of the imaging pixels and subsets of ToF pixels.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 to Burroughs et al., filed Apr. 12, 2018, with the United States Patent and Trademark Office, the disclosure of which is incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "some embodiments", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can, therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present disclosure described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and That which is claimed:

1. A Light Detection and Ranging (LIDAR) apparatus, comprising:
a detector comprising a first pixel and a second pixel configured to output respective detection signals responsive to light incident thereon, the first pixel comprising one or more time of flight (ToF) sensors, and the second pixel comprising one or more image sensors; and
a gate structure that overlaps at least a portion of the first pixel and at least a portion of the second pixel in plan view.

2. The LIDAR apparatus of claim 1, wherein the first and second pixels are configured to detect light of different first and second wavelength ranges, respectively, and wherein the gate structure is transparent to the light of one of the first and second wavelength ranges.

3. The LIDAR apparatus of claim 2, wherein the gate structure is not transparent to the light of another of the first and second wavelength ranges.

4. The LIDAR apparatus of claim 2, wherein respective junction regions of the first and second pixels overlap in plan view.

5. The LIDAR apparatus of claim 2, wherein respective junction regions of the first and second pixels are arranged side-by-side in plan view.

6. The LIDAR apparatus of claim 5, wherein the gate structure comprises a plurality of gate structures arranged adjacent a periphery of the first pixel.

7. The LIDAR apparatus of claim 6, wherein the second pixel comprises a plurality of sub-pixels arranged adjacent the periphery of the first pixel.

8. The LIDAR apparatus of claim 7, wherein the first and second pixels comprise first and second wavelength-selective filters that are configured to selectively transmit light of the first and second wavelength ranges, respectively, to respective junction regions of the first and second pixels.

9. The LIDAR apparatus of claim 8, wherein the first wavelength range comprises near infrared wavelengths, and wherein the second wavelength range comprises red, green, or blue wavelengths.

10. The LIDAR apparatus of claim 1, wherein the first and second pixels are provided in a same substrate.

11. The LIDAR apparatus of claim 10, wherein respective junction regions of the first and second pixels are provided at different depths relative to a surface of the substrate.

12. The LIDAR apparatus of claim 10, further comprising: receiver optics configured to collect the light over a field of view and direct first and second portions of the light to the first and second pixels, respectively.

13. The LIDAR apparatus of claim 10, further comprising:
isolation structures in or on the substrate, wherein the isolation structures separate respective junction regions of the first pixel from respective junction regions of the second pixel.

14. The LIDAR apparatus of claim 13, wherein the isolation structures comprise intermediate junction regions.

15. A Light Detection and Ranging (LIDAR) detector array, comprising:
a plurality of first pixels and a plurality of second pixels configured to output respective detection signals responsive to light incident thereon, the first pixels comprising time of flight (ToF) sensors, and the second pixels comprising image sensors; and
a plurality of gate structures, wherein each gate structure overlaps at least a portion of a corresponding first pixel and at least a portion of a corresponding second pixel in plan view.

16. The LIDAR detector array of claim 15, further comprising: a substrate comprising the plurality of first pixels and the plurality of second pixels therein.

17. The LIDAR detector array of claim 15, wherein the first and second pixels are configured to detect light of different first and second wavelength ranges, respectively, and the gate structures are transparent to the light of one of the first and second wavelength ranges but are not transparent to the light of another of the first and second wavelength ranges.

18. The LIDAR detector array of claim 15, wherein the gate structures are arranged adjacent a periphery of respective ones of the first pixels.

19. The LIDAR detector array of claim 18, wherein the second pixels respectively comprise red, green, and blue sub-pixels arranged adjacent the periphery of the respective ones of the first pixels.

20. The LIDAR detector array of claim 15, further comprising:
first and second readout circuits; and
a plurality of input/output (I/O) pads electrically connected to respective pixels of the first and second pixels, wherein the I/O pads are configured to output the respective detection signals from the first and second pixels to the first and second readout circuits, respectively.

* * * * *